(12) United States Patent
Iga

(10) Patent No.: US 6,256,042 B1
(45) Date of Patent: *Jul. 3, 2001

(54) GRAPHIC DISPLAY METHOD AND APPARATUS

(75) Inventor: Toshio Iga, Yokohama (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/202,422

(22) Filed: Feb. 28, 1994

(30) Foreign Application Priority Data

May 18, 1993 (JP) .................................... 5-115672

(51) Int. Cl.⁷ ...................................... G06F 15/00
(52) U.S. Cl. ............................................. 345/433
(58) Field of Search ...................... 395/133, 135; 345/433, 435, 436, 117, 121

(56) References Cited

U.S. PATENT DOCUMENTS

| | | | | |
|---|---|---|---|---|
| 4,847,788 | * | 7/1989 | Shimada | 395/135 |
| 5,133,052 | * | 7/1992 | Bier et al. | 395/155 |
| 5,257,349 | * | 10/1993 | Alexander | 395/159 |
| 5,293,469 | * | 3/1994 | Outa et al. | 395/133 |

* cited by examiner

*Primary Examiner*—Phu K. Nguyen
(74) *Attorney, Agent, or Firm*—Staas & Halsey LLP

(57) ABSTRACT

Graphic data generated by an application program implementing CAD, for example, are classified into groups according to their attributes and stored into memory. When a display request is issued, the graphic data are output onto a display device, one group at a time, thereby reducing the amount of attribute judging and attribute changing processing and thus achieving an increase in the display processing speed.

9 Claims, 3 Drawing Sheets

GRAPHIC MANAGEMENT TABLE

| ATTRIBUTES | GRAPHIC ITEMS |
|---|---|
| LINE TYPE=SOLID LINE<br>LINE WIDTH=THICK<br>COLOR=BLACK | ITEM1, ············, ITEMj |
| LINE TYPE=SOLID LINE<br>LINE WIDTH=THIN<br>COLOR=RED | ITEM2, ············, ITEMk |
|  |  |
| LINE TYPE=DOTTED LINE<br>LINE WIDTH=THICK<br>COLOR=G REEN | ITEMm, ············, ITEMn |

GRAPHIC DISPLAY METHOD AND APPARATUS

BACKGROUND OF THE INVENTION

1. Field of the Invention

The present invention relates to a method and apparatus for displaying graphics on a display device, for use in a system, such as a computer-aided design (CAD) system, that displays many graphic items on a display device. More particularly, the invention relates to a method and apparatus for displaying graphics on a display device in a multi-window environment.

2. Description of the Related Art

Application programs implementing a CAD system generate a large number of graphic elements such as lines with their attributes, including color and line width, specified, and display the generated graphic elements sequentially on a display device Display of a graphic element is accomplished by sending to a display device a command that specifies the attributes of the graphic element, and a graphic drawing command with the coordinates of the graphic element specified.

In the multi-window environment, since screen redraw requests are generated at frequent intervals, it is required that the screen, including the many graphic elements already generated, be output at once onto the display device in the shortest possible time. To achieve this, a graphic management facility for managing graphic information is provided between the application program and the display device. The graphic management facility receives graphic element data, including data specifying, for example, color, line width, etc., from the application program, and stores them into memory. When a draw request is input from the operating system (OS) or application program, the stored data are retrieved, and screen drawing is performed by sending an attribute specifying command and a draw command to the display device accordingly. At this time, instead of outputting an attribute specifying command prior to a draw command each time the command is invoked, the graphic management facility outputs an attribute specifying command only when the attributes of the graphic element to be output are different from those of the previously output graphic element. This is necessary to finish the drawing process in the shortest possible time.

The graphic management facility is delivered, for example, in the form of a library containing a large number of subroutines. When generating an execution module for an application program, the subroutines needed by the application program are fetched into the execution module.

Such a graphic management facility has contributed to drastically reducing the length of time required from the input of a draw request until the drawing process is completed. However, the above-described graphic management facility requires that the attribute data be compared each time the graphic element data are retrieved from memory. When processing a large number of line drawing data generated in a CAD system, the length of time required for the comparison of data cannot be neglected. This has been a major obstacle to speeding up the drawing process.

SUMMARY OF THE INVENTION

It is an object of the present invention to provide a graphic display method and an apparatus, which overcome the shortcomings of the prior art graphic management facility and are capable of displaying many graphic elements in a much shorter time than the prior art has been able to achieve.

According to the present invention, there is provided a graphic display method comprising the steps of: generating data of graphic elements having a plurality of attributes; classifying the generated graphic element data into groups according to the attributes thereof and storing the same into memory: and displaying the graphic element data stored in memory onto a display device, one group at a time.

According to the present invention, there is also provided a graphic display apparatus comprising: means for generating data of graphic elements having a plurality of attributes; means for classifying the generated graphic element data into groups according to the attributes thereof and for storing the same into memory; and means for outputting the graphic element data stored in memory onto a display device, one group at a time.

DESCRIPTION OF THE PREFERRED EMBODIMENTS

Figures 1, 2:
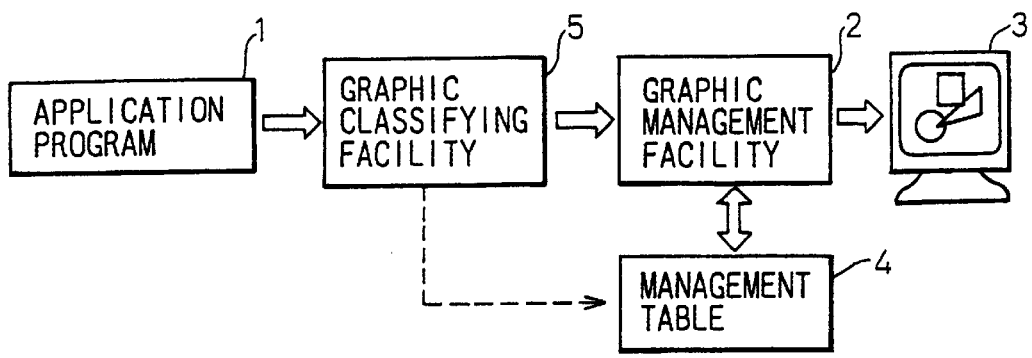
FIG. 1 is a block diagram illustrating a first embodiment of the present invention.
FIG. 2 is a diagram showing the contents of a graphic management table.

FIG. 1 is a diagram illustrating a first embodiment of the present invention. In the figure, the numeral 1 is an application program for creating graphic data; 2 is a graphic management facility for managing the graphic data created by the application program 1; 3 is a display device for displaying graphics; 4 is a graphic management table for storing graphic data or pointers pointing to the graphic data, classified according to their attributes; and 5 is a graphic classifying facility for classifying the graphic data according to their attributes.

The application program 1 is, for example, a program for implementing CAD, that generates graphic data by automatic and/or manual design and sequentially outputs the graphic data together with the data specifying their attributes. The graphic classifying facility 5 examines the attributes of the graphic data that the application program 1 outputs, and classifies them according to their attributes for storing into the graphic management table 4.

FIG. 2 is a diagram showing the contents of the graphic management table 4 in the above embodiment. As shown, the graphic management table 4 stores graphic items (graphic data or pointers pointing to the graphic data) classified according to their attributes. The graphic items stored in the graphic management table 4 are classified, for example, as "Item 1, . . . , Item j, for which the line type is a solid line, the line width is thick, and the color is black", "Item 2, . . . , Item k, for which the line type is a solid line, the line width is thin, and the color type is a dotted line, the line width is thick, and the color is green."

Figure 3:
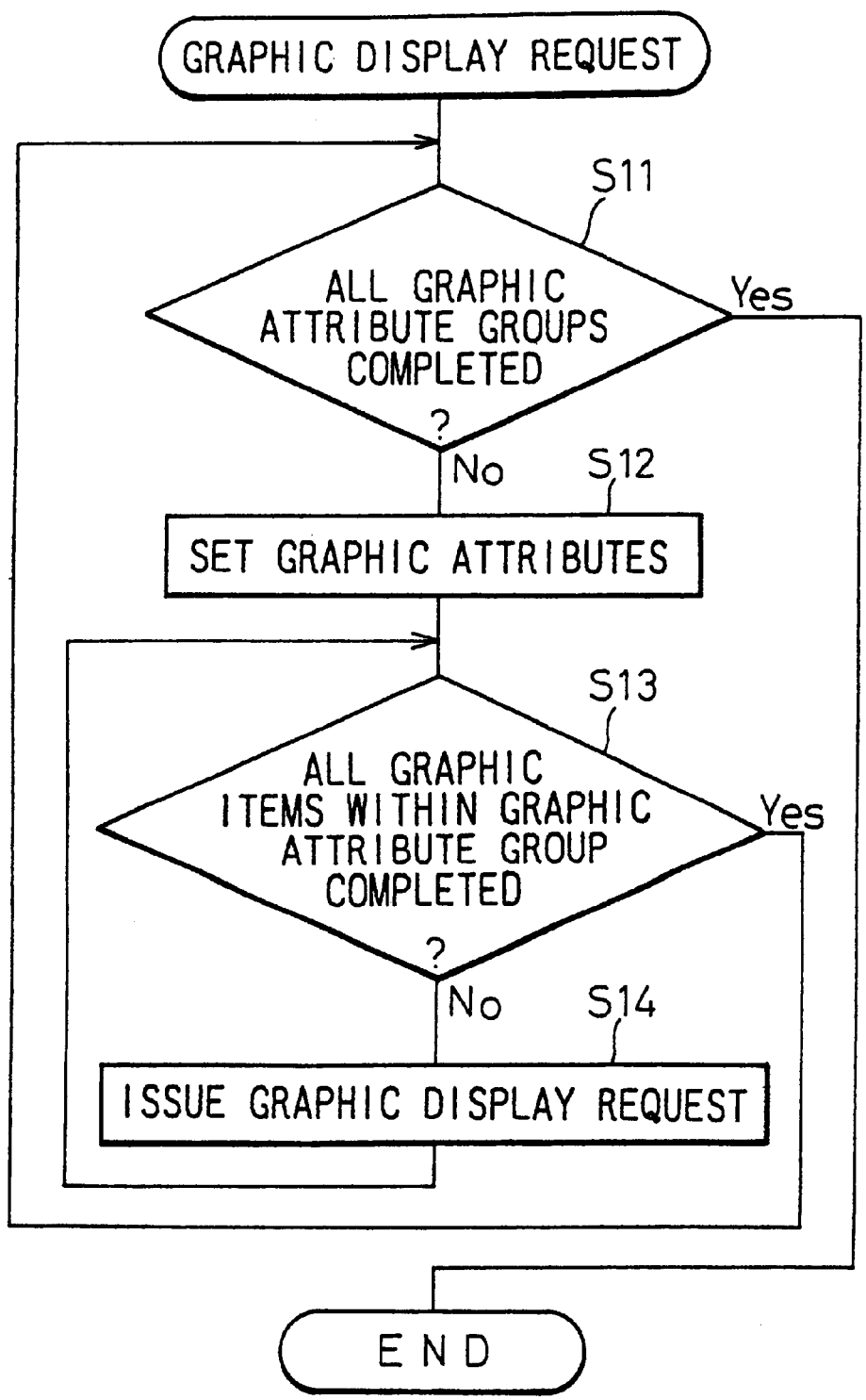
FIG. 3 is a flowchart illustrating the operation of the graphic management facility.

FIG. 3 is a flowchart illustrating the procedure for processing when a graphic display request is input to the graphic management facility 2 in the embodiment of FIG. 1.

When a graphic display request is issued from the application program 1 or OS, the graphic management facility 2 makes a decision as to whether display of graphic items has been completed for all graphic attribute groups (step S11); if not completed yet for all groups, one of the attributes of the graphic attribute groups yet to be displayed is set in the graphics display device 3 (step S12).

Next, in step S13, a decision is made as to whether display of all the graphic items within the graphic attribute group has been completed. If not completed yet, a graphic display request is issued to the graphics display device 3 (step S14).

Then, the process returns to step S13, and the above operation is repeated. When display of all the graphic items belonging to the graphic attribute group is completed, the process returns to step S11.

In step S11, a decision is made as to whether display of graphic items has been completed for all the graphic attribute groups; if not completed yet, the above operation is repeated on the next yet-to-be-displayed graphic attribute group.

When it is decided in step S11 that the processing has been completed for all the graphic data, the display processing is terminated.

In the present embodiment, the graphic classifying facility 5 is provided in conjunction with the graphic management table 4; the graphic items classified into attribute groups by the graphic classifying facility 5 are stored in the graphic management table 4 and a display request is issued for each graphic attribute group. Therefore, there is no need to make a decision each time as to whether the graphic attributes have been changed and to set the graphic attributes, as was the case with the previously described prior art configuration. Consequently, the processing in the graphic management facility 2 can be simplified.

Figure 4:
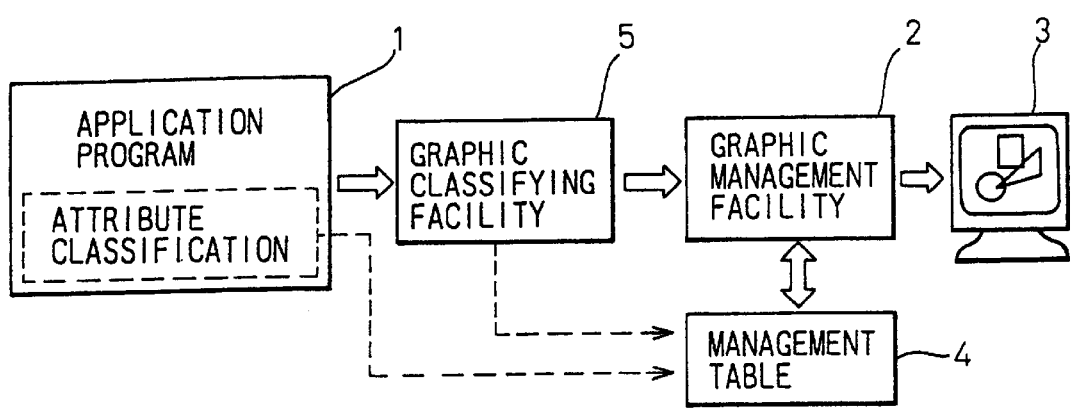
FIG. 4 is a block diagram illustrating a second embodiment of the present invention.

FIG. 4 is a diagram illustrating a second embodiment of the present invention. In the figure, the same parts as those shown in FIG. 1 are designated by the same reference numerals. The configuration of this embodiment is identical to that of FIG. 1, except that provisions are made so that graphic items can be classified according to their graphic attributes also by the application program 1.

For example, in a CAD system, there are cases in which prediction can be made in advance at the stage of application program writing that the application program will generate a large volume of graphic data having the same graphic attributes. In such cases, the application program 1 is written so that, instead of outputting these graphic data one by one to the graphic classifying facility 5 for classification into attribute groups, the graphic data are generated at once and stored directly into the graphic management table 4 as a new group. In this way, the amount of processing performed in the graphic classifying facility 5 can be reduced.

In the above first and second embodiments, there are cases in which the application program generates graphic items that share the same attributes (for example, line type, line width) except one attribute (for example, color) but that vary in color in many ways (for example, in dozens of ways). The memory requirement in such cases would become exorbitant because of the diversity in only part of the attributes. In such cases, therefore, trade-offs between the memory requirement and the processing time are made in the following manner.

i) In cases in which the attribute that cannot be shared can be identified in advance at the stage of application program writing, the attribute that cannot be shared is excluded from the classification, and graphic items sharing the same attributes except the excluded attribute are classified into the same group. The graphic management facility examines the excluded attribute for each graphic to be displayed, to determine whether the attribute is the same as the corresponding attribute of the previously displayed graphic, and if not, sets a new graphic attribute in the display device.

ii) In cases in which the attribute that cannot be shared cannot be identified in advance at the stage of application program writing, graphic items are first classified with respect to all graphic attributes, and after that, the graphic classifying facility 5 merges groups having less frequency of use with groups having similar characteristics to them, for example, with groups that are identical to them in line type and line width but differ only in color. The operation of the graphic management facility is the same as that in the case of i).

In the above first and second embodiments, the graphic classifying facility 5 and the graphic management facility 2 are both delivered in the form of a library containing a large number of subroutines, and when generating an execution module for the application program, the subroutines needed by the application program are fetched into the execution module.

What is claimed is:

1. A graphic display method comprising the steps of:
   generating data for graphic elements, each graphic element having a plurality of attributes;
   classifying the generated graphic element data into groups according to the attributes of the graphic elements and arranging the groups into memory according to classification; and
   outputting the graphic element data arranged in memory onto a display device, one group at a time; and
   reducing draw process time by redisplaying only those graphic elements having attributes that have changed from a prior classification.

2. A method according to claim 1, wherein the graphic element data includes data specifying display positions of lines, and the plurality of attributes include the type, width, and color of lines.

3. A method according to claim 1, further comprising the step of transferring the generated graphic element data from an application program to a graphic classifying facility for classifying the graphic element data into groups.

4. A method according to claim 1, wherein an application program for generating the graphic element data generates the graphic element data classified into groups.

5. A method according to claim 1, wherein the graphic element data are classified into groups after excluding at least one of the plurality of attributes from the classification.

6. A graphic display apparatus comprising:
   means for generating data of graphic elements, each graphic element having a plurality of attributes;
   means for classifying the generated graphic element data into groups according to the attributes of the graphic elements and for arranging the groups into memory according to classification; and
   means for outputting only the graphic element data arranged in memory having attributes that have changed from a prior classification onto a display device, one group at a time.

7. An apparatus according to claim 6, wherein the graphic element data includes data specifying display positions of lines, and the plurality of attributes include the type, width, and color of lines.

8. A graphic display method comprising the steps of:
   generating graphic element data including a plurality of graphic element attributes;
   classifying the generated graphic element data into groups according to the attributes of the graphic elements and arranging the groups into memory according to classification; and increasing a drawing process speed by outputting the plurality of graphic element attributes that have changed from a prior classification to an output device.

9. A graphic display apparatus comprising:

means for generating data of graphic elements, each graphic element having a plurality of attributes;

means for classifying the generated graphic element data into groups according to the attributes of the graphic elements and for arranging the groups into memory according to classification; and means for reducing output processing time by outputting the graphic element data arranged in memory having attributes that have changed from a prior classification to an output device.

* * * * *